United States Patent Office 2,765,285
Patented Oct. 2, 1956

2,765,285

LOW VISCOSITY, HIGH DENSITY, FREE FLOWING, PIGMENTED BASE

Edward Louis Weller, Jr., East Orange, N. J.

No Drawing. Application March 5, 1952,
Serial No. 275,040

12 Claims. (Cl. 260—20)

My invention relates to low viscosity, high density, free flowing, pigmented bases used as ingredients in the production of paints, enamels, lacquers, primers, surfacers as well as pigmented bases used in the formulation of dyes, inks, and other related products and a method of producing the same.

Generally, the paints, lacquers, etc. which are ready for use, consist of finely divided pigment particles evenly dispersed throughout a vehicle consisting of oil, resin, or solvent or a combination of these ingredients. In order to disperse the pigment evenly throughout a proper vehicle, it is necessary, in the manufacture of the above products, to grind and finely divide the raw pigments in a material which is capable of being miscible in the vehicle selected.

In the prior art, the material used for the purpose of dispersing the pigments to form bases for paints, etc., is generally the same oil, resin and/or solvent that is later used as a vehicle for the finished paint, etc. Generally, two very common methods have been employed for producing this base in the past. One method was to introduce a combination consisting of a small percentage of pigment to a large percentage of oil, resin and/or solvent and grind this material in a pebble or steel ball mill for a number of days. It is obvious therefore that this method of producing a pigmented base is very time-consuming and in addition produces a low pigment content base which when mixed with a vehicle will produce relatively few gallons of finished product.

Another prior art method of producing a pigmented base is to grind a mixture consisting of a high percentage of pigment with a reasonably low percentage of oil, resin, and/or solvent for a considerable length of time in a rolling mill, dough machine or high-powered kneader.

Both of the above prior art methods are costly and time-consuming, the manufacturer selecting one or the other methods of producing a pigmented base by weighing the advantage of employing a low cost pebble or steel ball mill, requiring low power and producing fewer gallons of finished product against the cost of employing a reasonably expensive high-powered rolling mill, dough machine or kneader.

In the prior art use of pebble or steel ball mills, it is necessary to introduce a large amount of resin and solvent or oil and solvent, together with the raw pigment to obtain a mix with a sufficiently reduced viscosity to allow the cascading of the steel balls or pebbles for grinding purposes. With the sizes of these pebble or steel ball mills, necessarily constant, it is apparent that an increase of the vehicle required to obtain the reduced viscosity could be obtained only by a decrease in the amount of pigment in the mill. In order to meet the demand of larger production, and to surmount the difficulty of producing only small quantities of pigmented bases at a time, the industry in general has relied upon the use of dough machines, rolling mills and kneaders to grind the dough-like mixture which resulted from a mixing of a high percentage of pigment with a correspondingly low percentage of resin and oil or resin and solvent. Many companies have found it necessary to use both methods of producing pigmented bases, relying on the demand for certain bases to govern the method of manufacture.

Until the time of my invention, there was no method for producing pigmented bases which incorporates the use of high percentage pigment mixes or high density mixes capable of being dispersed in an inexpensive pebble or steel ball mill, because, as pointed out above, the viscosity of the high density mix would not permit the cascading of the pebbles or steel balls.

Accordingly, it is an object of my invention to produce a high density pigmented base which may be converted to a variety of paints, enamels, lacquers, primers, surfacers and related finishes, merely by the addition of suitable vehicle such as oils, resins, solvents and the like.

Another object of my invention is to produce high density pigmented bases in an inexpensive steel ball or pebble mill.

Another object of my invention is to produce an extremely concentrated, free flowing pigmented base which may be stored for extended periods of time without re-agglomeration or deterioration.

Another object of my invention is to reduce the time necessary for grinding to a proper dispersion, a pigmented base.

Another object of my invention is to provide a method by which the concentrated pigmented bases may be modified or stabilized to a necessary degree to make them suitable for storage or further processing to a finished product.

Other and further objects and advantages of my invention will become apparent from the following disclosure and claims.

Briefly, my invention resides in producing a highly concentrated, stabilized, pigmented base capable of being stored and which is produced in a pebble or steel ball mill and ground to a satisfactory consistency or dispersion in a much shorter time than has been obtainable heretofore using prior art methods. In accordance with my invention, I prepare a charge for a steel ball or pebble mill which charge consists by weight as follows:

Raw pigment_____ From approximately 50 to approximately 85%.
Resin_____ From approximately 4 to approximately 20%.
Organic solvent___ Balance.

The above ratios depend upon the properties of the pigment, resin and solvent used. Generally, I have found that many of my mixes required a ratio by volume of approximately one part of resin to four parts of solvent; however, the resin to solvent ratio in my charges may vary from approximately 3:2 to about 1:7 by volume, which would correspond to a dry resin to solvent ratio of from 3:7 to 1:15. Also, it should be pointed out that the 4 to 20% resin range specified above would correspond to a 2 to 10% dry resin range. Over a period of time and/or with different batches of the same pigments and different batches of resin the ratios stated in the last sentence might vary slightly. I believe that the variation from charge to charge of identical mixes is due to the particle size, structure of the clusters of air-pigment particles, magnitude of cohesive and/or adhesive forces holding these particles together and the oil absorption of the pigment. This variation may also be due to the slight difference in characteristics of different batches of resin.

In order to determine the amounts of resin and solvent which should be used with a specific quantity of pigment, the resin, solvent, and pigment having been selected for the characteristics which are desired and which are described in prior art publications, it is advisable to proceed according to the following manner: To a mill charge consisting of approximately 75% by weight of pigment, add approximately 4% by weight of resin and 21% by weight of solvent. Operate the mill for a sufficient length of time to let the grinding charge thoroughly mix and obtain a true grinding viscosity rather than a half-mixed charge composed of unmixed solvents, resin and pigment. An experienced operator can judge the viscosity of the charge by listening to the mill as it rotates. An uneven thudding noise indicates that the grinding charge is too heavy and lacks the necessary flowing properties, thus causing the balls or pebbles to be carried too far up the side of the mill and very frequently over the top and then dropping them down in clusters which are held together by a mass of the grinding charge.

A charge which has been thinned too much will cause the balls or pebbles to cascade and rotate against the lining of the mill with an unusual amount of noise. Overthinning will cause an undue amount of wear on the lining and steep balls or pebbles with no improvement in grind or grinding time.

In case of doubt, the mill should be stopped and the charge examined. This charge should not only be of the proper viscosity but should possess a quality which gives it the feel of a syrupy viscous material. The nature of the properly adjusted grind is of such a composition that the pigment will remain in suspension. If the mill charge does not possess the syrupy viscous characteristics, as described above, add small quantities of resin accompanied by sufficient mixing until the desired slick, smooth, stringy, syrupy, viscous characteristics are produced. This adjustment will also reduce the paste-like appearance which might be exhibited by the mill charge and at the same time reduce its viscosity.

If the mill charge exhibits the above mentioned desirable characteristics but the steel balls or pebbles do not cascade properly since they are retarded by a somewhat higher viscosity than is normally desired in a mill charge, solvent should be added in small quantities with mixing until the properly adjusted viscosity for grinding is obtained.

It is to be remembered that natural or synthetic commercial resins are supplied in liquid form and consist of dry resins dissolved in a suitable solvent and when resin is referred to in the specification unless otherwise specified, I mean a resin or a modified resin dissolved in a suitable solvent in the ratio of approximately 1:1 by weight. Also, when I refer to pigment or pigments throughout the specification and claims, I mean an organic or inorganic pigment or combination of pigments, with or without extenders or inerts such as talc, calcium carbonate, silica or the like. Further, when I refer to vehicle in the specification and claims, I means a resin and solvent mixture.

Contrary to the prior art beliefs and theories, I have found that the viscosity of a mix or charge, consisting of a high percentage of pigment and a low percentage of solvent is drastically reduced by the addition of a small quantity of resin. In the first state of mix, the high pigment and low solvent charge consists of a dough-like mass which is unworkable insofar as a pebble or steel ball mill is concerned. Since the viscosity of the pigment and solvent mixture is reduced by the addition of small amounts of resin, as described above, this original unyielding dough-like mixture having a high concentration of pigment is converted by mixing in a steel ball or pebble mill into a free flowing mass which has the desired characteristics essential for milling therein. Conversely, prior art concepts and established theories maintain that the addition of resin to a mixture of pigment and solvent will increase the viscosity of the resulting mass.

Generally, in the industry, the raw pigment is received in bulk form as lumped particles of agglomerates which must be dispersed in a proper medium. It is a well known and proven fact that modern pigments have very small particle sizes and these sizes are not changed when the base is ground in a mill; the object of grinding or milling being to break down the lumped pigment particles or agglomerates into a dispersion consisting of individual pigment particles in a medium which is called the grinding medium. The dispersion is governed by the dispersion methods used and the degree of dispersion desired. Frequently it is advantageous not to mill the pigment to a good dispersion; however, products having a high gloss finish, such as lacquers, of necessity, must have a high degree of dispersion. Using my process, a good dispersion of a pigmented base can normally be obtained anywhere from four hours to about forty-eight hours depending on the degree of dispersion desired and also on the type of pigment used. In some cases, a four-hour dispersion using my process is equivalent to a three-day milling process using the prior art methods, thus, the productive capacity of a given mill may be increased by more than 20 times.

While I do not wish to be limited to any theory as to what happens to the pigment particles in my grinding process, I believe that each pigment particle is coated with air, and groups of particles in this state will be held cohesively and/or adhesively together to form agglomerates. In order to disperse pigments, it is necessary to accomplish several things: first, the air which coats each particle must be displaced; this is called wetting. Secondly, cohesive and/or adhesive forces holding clusters of air-pigment particles together must be destroyed by pressure and shearing forces; this is termed grinding. Also there are various other characteristics of pigments which influence their dispersion properties, such as oil absorption characteristics, particle sizes and water envelopes. In addition, the various particles must have freedom in a vehicle in order for grinding to take place.

I believe that the rapid dispersion characteristics of my process are due to the fact that just sufficient resin is present in the mass to completely wet the pigment particles, causing the air around these particles to be displaced. With a low viscosity mix having high percentage of pigment particles present, each cluster of pigment does the maximum amount of work on each other cluster of pigment, as the pebbles or steel balls cascade in the mill.

It is my belief that the prior art practice of charging a steel ball or pebble mill with a mix consisting of a small amount of pigment and a large amount of resin and/or solvent, materially reduces the amount of work done on the pigment by the steel balls or pebbles, since the pigment particles are free to move in the liquid medium, thus reducing the shearing action of the balls or pebbles on these particles.

The exact reason for a drop in viscosity which is affected by the introduction of the small amount of resin is not completely understood by me in its chemical or mechanical theory other than has been stated above. When my mixture is first introduced into the mill, it making very little difference which ingredient is added first, the mixture seems to take the form of a dough-like mass due to the extremely high pigment to resin-solvent ratio. At first, it would appear that this mass will not break down, but after mixing in a mill for approximately 15 minutes to one hour, a free flowing high density mass is produced.

My process is applicable to the grinding of organic pigments, inorganic pigments or a combination of both and is equally applicable to the grinding of pigments with extenders.

It is preferable when grinding many types of primers or surfacers and in general when grinding dark colored pigments, to employ a steel ball mill. One of the many advantages of using a jacketed steel ball mill is the fact that the viscosity of the mass may be kept constant through controlling the temperature of the jacket water. On the other hand, it is generally desirable, when grinding mixes containing white or light colored pigments, to employ a pebble mill, since these pigments may be discolored by the steel balls of a steel ball mill. It is to be remembered that pebble charges have a much lower specific gravity than steel ball charges and therefore may have a less specific gravity than the charge or mix introduced into the pebble mill; and therefore, in order to produce the necessary grinding action, the mass should have a sufficiently low specific gravity to produce a great enough negative buoyancy of the pebbles in the mill. In some instances, I have been able to overcome this limitation by adding just sufficient vehicle to decrease the specific gravity of the mix to the desired degree. It is advisable to take samples from the mill in order to determine the degree of dispersion reached by the mix; these samples must be let down or diluted very carefully, since the pigmented base within the mill is in a critical state of balance and an attempt to mix the pigmented base directly with a large amount of vehicle may result in a re-agglomeration of the pigment and/or a throw-out of the dispersion mixture. I have found that a very small quantity of resin of the type which was initially incorporated with the original mill charge with constant agitation, may be added to the concentrated mill base, and thus form a homogeneous or stabilized mass. Also, the same results are obtained when a resin possessing the compatibility characteristics of the original mill charge resin is substituted for the resin mentioned in the last sentence. It should also be pointed out that, with constant agitation, the original mill charge resin or a resin having the tolerably compatability characteristics of the original mill charge resin and a suitable solvent combined in solution may be mixed with a sample from the mill to form a homogeneous or stabilized mass; however, this solution should be added very slowly. It should be noted that when a sample from the mill is taken to determine its degree of dispersion, this sample almost immediately begins drying due to the high pigmentation of the mix and it will be noticed that a skin formation is visible thereon in a very short period of time if the mill sample is not immediately stabilized; therefore, it is necessary to process the sample, as described above, immediately upon removing this sample from the mill.

Upon completion of the grinding process in the mill and on nearly all occasions, after it has been ascertained by sampling that a proper dispersion exists, I have found it desirable to introduce a very small quantity of resin to the charge in the mill. While the introduction of resin, to the unstabilized base in the mill, is not absolutely necessary at this time, it is desirable, since the resin added, stabilizes the mix, as described above. It is to be remembered that the stabilization process previously described for samples is a very important step and should be used in stabilizing the entire mill grind since if an attempt were made to mix the unstabilized dispersed pigmented base with a large quantity of vehicle, without first stabilizing the base, a throw-out or re-agglomeration would result. I have found that it is impossible by milling to re-disperse the re-agglomerated pigmented base.

While the resin stabilizes the mill charge, a small addition of solvent is recommended since the solvent will reduce the viscosity not only of the resin but also of the original mill charge and facilitate the handling of both the resin before it is added and also the resulting stabilized mix. It is to be remembered however that the use of solvent together with the resin is not necessary to the performance of my process.

In order to produce stabilization, I add to the mix, from about ½ to 2 times the amount of resin added to the original grinding charge, although these figures will vary for various types of pigments and/or mill charges.

After the addition of resin as recommended above, the mill should be put in operation for a short period of time ranging from 10 minutes to one-half hour depending upon the mill charge or size of charge and type of pigment being dispersed. In some instances, it is advantageous to add the resin in successive small increments to accomplish stabilization. After the resin has been added and properly mixed, the stabilized pigmented base may be used or stored according to prior art methods.

It has been found that certain pigment dispersions produced in accordance with my invention are capable of being stored for long periods of time, if they are stabilized with small additions of resin which should be added to the base prior to dumping thereof. With proper handling, my concentrated stabilized bases may be stored for long periods of time without skinning, jelling or re-agglomeration and without extensive settling.

It should be pointed out that some of the unstabilized pigmented bases may be removed from the mill and stored in their dispersed form in suitable containers for future use; in this instance, it may be deemed desirable to float a solvent on the top of the pigmented base to prevent the formation of a slight film on the top thereof. These unstabilized concentrated pigmented bases can be stored indefinitely and then processed for final use. It is to be remembered that the steps for stabilization, as mentioned above, should be carried out on this pigmented base prior to attempting to form a finished product therewith. If desired, the cut-back or stabilization can be accomplished in other than a mill, by the very careful addition of small percentages of resin and sometimes equally small percentages of solvent accompanied by a continued agitation of this mass as these ingredients are added.

My invention may be more readily understood by a consideration of the following illustrative examples:

*Example No. 1*

Steel ball mill—water jacketed. Inside measurements of mill 12" x 15½". Actual capacity empty (containing no steel balls)—17 gal.

A 33% charge of a mixture of ⁷⁄₁₆" and ¹⁰⁄₁₆" polished steel balls is used.

Load into mill:

| | |
|---|---|
| "Guardite" _____pounds__ | 34¼ |
| "Zinc Chromate X883"_____do____ | 12½ |
| Milled talc_____do____ | 15½ |
| "Beckosol 1303"_____gallons__ | 1 |
| Xylol _____do____ | 4 |

Maintain a temperature of about 30° C. Run 4 hours and add:

| | |
|---|---|
| "Beckosol 1303"_____gallons__ | ½ |

Run in mill 15 minutes and unload. Yield approximately 7.75 gallons.

*Example No. 2*

Steel ball mill—D. J. Patterson Mfg., 3'6" x 48".

A 33% charge of a mixture of ⁵⁄₁₆", ⁷⁄₁₆" and ¹⁰⁄₁₆" polished steel balls is used.

Load into mill:

| | |
|---|---|
| Titanium dioxide_____pounds__ | 432 |
| "Zinc Chromate X883"_____do____ | 259¼ |
| Milled talc #232_____do____ | 302½ |
| "Beckosol 1303"_____gallons__ | 18 |
| Xylol _____do____ | 60 |

Run 6 hours and add:

| | |
|---|---|
| "Beckosol 1303"_____gallons__ | 20 |
| Xylol _____do____ | 25 |

Run in mill 30 minutes and unload.
Yield approximately 160 gallons.

Example No. 3

Pebble mill—actual capacity (containing no pebbles)—
38 gal.
A 45% charge of flint pebbles is used.
Load in mill:

| | |
|---|---|
| C. P. Ferndal Green Extra Light #3000 | pounds 125 |
| "Beckosol 1326B" | gallons 2½ |
| Xylol | do 6 |
| Toluol | do 1 |

Run 48 hours and add:

| | |
|---|---|
| "Beckosol 1326B" | gallons 2 |
| Xylol | do ½ |

Mix 1 hour and unload.
Yield approximately 15 gal.

The above examples were repeated employing the following pigments, resins and solvents:

EXAMPLES FOR PEBBLE MILL

| Percent and Kind Pigment (by weight) | Percent and Kind of Resin by Liquid Weight (liquid contains approximately 50% dry resin dissolved in solvent) | Solvent by Weight |
|---|---|---|
| 43.4% { "Maroon 278C," 98%<br>"Kadox," 2% } | 19.4% "Glyptal 2509" | 37.2% Mineral Spirits. |
| 50.4% { "Para Toner Red A175," 99%<br>"Kadox," 1% } | 16.1% "Glyptal 2509" | 33.5% Mineral Spirits. |

EXAMPLES FOR STEEL BALL MILL

| Percent and Kind Pigment (by weight) | Percent and Kind of Resin by Liquid Weight | Solvent by Weight |
|---|---|---|
| 64.4% "Norwood Green M-10-8516" | 8.6% "Glyptal 2462" | 27.0% Xylol. |
| 66.1% { "Irox Yellow," 75%<br>"Mapico Black," 14.4%<br>"Zinc Oxide XX50," 3.7%<br>Chrome Yellow, 6.9% } | 12.3% "Beckosol 1303" | 21.6% Xylol. |
| 67.5% { "Cosmic Black," 57.6%<br>Titanium Dioxide, 36.6%<br>"Mapico Yellow, Dark Orange," 5.8% } | 13% "Glyptal 2509" | 19.5% Mineral Spirits. |

Guardite—manufactured by Processed Material Corporation—$Fe_2O_3$, 38.9%; silica, 53%; alumina, 5.2%; magnesium, .02%; calcium, .64%; sulphur, .04%.

C. P. Ferndal Green Extra Light 3000—chrome yellow, 94.5%; iron blue, 5.5%.

Zinc Chromate X883—manufactured by Imperial Paper and Color Corp.—38.4%, ZnO; 41.8% $CrO_3$; 10.2% $K_2O$; 7.5% $H_2O$.

Para Toner Red A-175—manufactured by Reichhold Chemicals, Inc.—para-nitro-benzene-azo-beta-napthol.

Kadox—manufactured by New Jersey Zinc Company—99% zinc oxide.

Norwood Green M-10-8516—manufactured by American Cyanamid Company—chrome yellow 74.7%, iron blue 25.3%.

Irox yellow—manufactured by Reichard-Coulston, Inc.—98-99% $Fe_2O_3$:$H_2O$.

Mapico Black—manufactured by Columbian Carbon Company—98% black iron oxide.

Cosmic Black—manufactured by American Agricultural Chemical Company—a drop and bone black containing a minimum of 8% carbon.

Zinc Oxide XX50—manufactured by New Jersey Zinc Company—98% ZnO.

Mapico Yellow Dark Orange—manufactured by Columbian Carbon Company—a synthetic iron oxide containing a minimum of 87% $Fe_2O_3$.

Beckosol 1326B—manufactured by Reichhold Chemicals, Inc.—a phenol modified linseed-china-wood oil alkyd resin (18% phthalic anhydride and 52% oil) containing 49-51% by weight solids in xylol and aromatic, high solvency naptha.

Glyptal 2462—manufactured by General Electric Company—soya modified phthalic anhydride alkyd resin (40% phthalic anhydride) containing 49-51% by weight solids, dissolved in 3:1 by volume xylol and solvent petroleum spirits.

Glyptal 2509—manufactured by General Electric Company—soya modified phthalic anhydride alkyd resin (35% phthalic anhydride) containing 49-51% by weight solids dissolved in solvent petroleum spirits.

Beckosol 1303—manufactured by Reichhold Chemicals Inc.—rosin modified alkyd type resin containing 49-51% solids dissolved in xylol.

It will be obvious to those skilled in the art that many variations may be made in the embodiments disclosed for the purpose of illustration without departing from the scope of my invention as defined by the appended claims wherein the word resin means dry resin unless otherwise stated.

I claim:

1. A process for producing a dense, free-flowing pigmented base suitable for use in the production of paints, enamels, lacquers and related finishes, which comprises mixing together in a low-powered mixing mill a dough-like mixture of a pigment and a solvent- and resin-containing vehicle, said vehicle containing insufficient solvent to impart fluidity to said mixture by containing sufficient resin to provide 2 to 8% resin based on the weight of the entire mixture, and continuing the mixing until the mixture is reduced to a free-flowing uniform fluid suspension.

2. The process of claim 1 wherein the resulting free-flowing pigmented base is stabilized by incorporating therein additional vehicle, and continuing the mixing operation for a short period of time.

3. A process for producing a dense, free-flowing pigmented base suitable for use in the production of paints, enamels, lacquers and related finishes, which comprises mixing together in a low-powered mixing mill a pigment and a resin- and organic-solvent-containing vehicle mixture initially in the form of a solid, dough-like mass containing from about 50 to about 85% by weight of pigment of the class consisting of chromate pigments, metal oxide pigments, organic pigments and iron blue pigments and less than 8% by weight of resin, the ratio of resin to organic solvent in said vehicle being within the range of about 1:3 to about 1:9 and continuing the mixing until the mixture is reduced to a free-flowing uniform fluid suspension of said pigment in said vehicle.

4. A process for producing a dense, free-flowing pigmented base suitable for use in the production of paints, enamels, lacquers and related finishes, which comprises mixing together in a pebble mill for a sufficient period of time to obtain a free-flowing, uniform, fluid suspension a pigment and a vehicle containing a synthetic organic condensation resin, said mixture initially comprising a solid, dough-like mass unworkable in low-powered mixers, containing from about 50% to about 85% by weight of pigment of the class consisting of chromate pigments, metal oxide pigments, organic pigments and iron blue pigments and less than 8% by weight of resin, the ratio of resin to organic solvent in said vehicle being approximately 1 to 5, the resulting free-flowing pigment base being stabilized by incorporating therein additional vehicle and continuing the mixing operation for a sufficient time to uniformly disperse said additional vehicle throughout the pigment base.

5. A process for preparing a dense high-pigment-content free-flowing pigment base for coating finishes, which process comprises pebble milling a dough-like mixture of titanium dioxide pigment and a coating vehicle, said mixture having by weight about 71.5 to about 76.2% of titanium dioxide pigment, about 3.23 to about 3.83% of a coating resin, and about 20.4 to about 24.9% of a coating solvent for said resin, continuing the milling until the mixture is reduced to a free-flowing uniform dispersion of said pigment in said vehicle, then adding a stabilizing amount of coating vehicle, and continuing the milling until the mixture is stabilized against agglomeration.

6. A process for preparing a dense high-pigment-content free-flowing pigment base for coating finishes, which process comprises pebble milling a dough-like mixture of chrome yellow pigment and a coating vehicle, said mixture having by weight about 76.25 to 84.75% of chrome yellow pigment, about 2.12 to 3.4% of a coating resin and about 12.85 to 20.55% of a coating solvent for said resin, continuing the milling until the mixture is reduced to a free-flowing uniform dispersion of said pigment in said vehicle, then adding a stabilizing amount of coating vehicle, and continuing the milling until the mixture is stabilized against agglomeration.

7. A process for preparing a dense high-pigment-content free-flowing pigment base for coating finishes which process comprises pebble milling a dough-like mixture of chrome orange pigment and a coating vehicle, said mixture having by weight about 80 to 85.12% of chrome orange pigment, about 2.03 to 3% of a coating resin, and about 12.85 to 17.25% of a coating solvent for said resin, continuing the milling until the mixture is reduced to a free-flowing uniform dispersion of said pigment in said vehicle, then adding a stabilizing amount of coating vehicle, and continuing the milling until the mixture is stabilized against agglomeration.

8. A process for producing a dense, free-flowing pigmented base suitable for use in the production of paints, enamels, lacquers and related finishes, which comprises mixing together in a low-powered mixing mill a pigment and a resin- and organic-solvent-containing vehicle mixture initially in the form of a solid, dough-like mass containing from about 50 to about 85% by weight of pigment of the class consisting of chromate pigments, metal oxide pigments, organic pigments and iron blue pigments and less than 8% by weight of resin, the ratio of resin to organic solvent in said vehicle being within the range of about 3:7 to about 1:15 and continuing the mixing until the mixture is reduced to a free-flowing uniform fluid suspension of said pigment in said vehicle.

9. A process for producing a dense, free-flowing pigmented base suitable for use in the production of paints, enamels, lacquers and related finishes, which comprises mixing together in a low-powered mixing mill a dough-like mixture of a pigment and a solvent- and resin-containing vehicle, said vehicle containing insufficient solvent to impart fluidity to said mixture but containing sufficient resin to provide 2 to 10% resin based on the weight of the entire mixture, and continuing the mixing until the mixture is reduced to a free-flowing uniform fluid suspension.

10. The process of claim 1 wherein the pigment comprises a combination of organic and inorganic pigments.

11. A process for producing a dense, free flowing pigmented base suitable for use in the production of paints, enamels, lacquers and related finishes which comprises mixing together in a low-powered mixing mill a plurality of pigments and extender with a resin- and organic solvent-containing vehicle mixture initially to form a solid, dough-like mass containing from about 50% to about 85% by weight of said plurality of pigments and extender and less than 8% by weight of resin, the ratio of resin to organic solvent in said vehicle being within the range of about 3:7 to about 1:15 and continuing the mixing until the mixture is reduced to a free flowing smooth, syrupy, viscous uniform fluid suspension.

12. The process of claim 11 wherein the resulting free flowing pigmented base is stabilized by incorporating therein additional vehicle added thereto in increments, and continuing the mixing operation after each increment is added.

References Cited in the file of this patent

UNITED STATES PATENTS

| | | |
|---|---|---|
| 2,232,426 | Barrett | Feb. 18, 1941 |
| 2,280,135 | Ward | Apr. 21, 1942 |
| 2,379,070 | Evans et al. | June 26, 1945 |
| 2,544,636 | Peck | Mar. 6, 1951 |

OTHER REFERENCES

Daniel: Circular 744 of the Scientific Section, National Paint, Varnish, and Lacquer Assoc., October 1950.

Shurts: Circular 745 of the Scientific Section, National Paint, Varnish and Lacquer Assoc., October 1950.